United States Patent [19]

Krall et al.

[11] Patent Number: 4,983,349
[45] Date of Patent: Jan. 8, 1991

[54] APPLYING LABELS TO BLOW MOLDED ARTICLES

[75] Inventors: Thomas J. Krall, Toledo; Robert A. Myers, Perrysburg, both of Ohio

[73] Assignee: Owens-Illinois Plastic Products Inc., Toledo, Ohio

[21] Appl. No.: 372,391

[22] Filed: Jun. 27, 1989

Related U.S. Application Data

[62] Division of Ser. No. 170,473, Mar. 21, 1988, Pat. No. 4,854,848.

[51] Int. Cl.$^5$ .............................................. B29C 49/24
[52] U.S. Cl. ..................................... 264/509; 425/503
[58] Field of Search ...................... 264/509; 425/126.1, 425/504, 112

[56] References Cited

U.S. PATENT DOCUMENTS

| | | | |
|---|---|---|---|
| 4,479,771 | 10/1984 | Slat et al. | 264/509 |
| 4,636,166 | 1/1987 | Franks et al. | 264/509 |
| 4,639,206 | 1/1987 | Darr | 425/504 |
| 4,679,997 | 7/1987 | Plenzler et al. | 264/509 |
| 4,721,451 | 1/1988 | Darr | 264/509 |
| 4,802,832 | 2/1989 | Shapler | 264/509 |
| 4,815,955 | 3/1989 | Krall | 425/126.1 |
| 4,838,776 | 6/1989 | Hasl | 264/509 |

Primary Examiner—Jan H. Silbaugh
Assistant Examiner—Catherine Timm

[57] ABSTRACT

In the forming of an article by blow molding parisons into conformity with cavities of an array of mold sections parisons in the form of tubes are extruded from an extruder into an array of neck molds on a head, the head is moved axially away from the extruder to define the parisons, mold sections are closed about the parisons and the parisons are blown outwardly and a take out mechanism grasps and removes the containers after the mold sections are opened. The apparatus for application of labels to the hollow blown plastic articles includes a label carrier mounted for reciprocating movement between the open mold sections and supporting an array of spaced vacuum pick up devices. The carrier is mounted for reciprocating movement past a source of labels exterior to the blow molding mechanism so that labels are picked up by each of the vacuum pick-up devices, and the carrier is moved between the longitudinally spaced array of mold sections, the vacuum devices are actuated to deliver the array of labels to the cavities of the array of open mold sections at the same time as the take out mechanism is moved adjacent the mold sections to grasp the blown containers so that the labels are delivered with substantially no delay in cycle time.

3 Claims, 3 Drawing Sheets

APPLYING LABELS TO BLOW MOLDED ARTICLES

This is a divisional of co-pending application Ser. No. 07/170,473 filed Mar. 21, 1988, now U.S. Pat. No. 4,854,848.

This invention relates to the application of labels and particularly to the application of labels to hollow blown plastic articles.

BACKGROUND AND SUMMARY OF THE INVENTION

In the making of hollow blown articles such as containers from plastic material, it has heretofore been suggested that labels be held in the cavity of mold sections by vacuum so that when a parison is blown outwardly into conformity with the cavity, the label becomes adhered or bonded to the article.

In one type of apparatus commonly known as an extrusion-blow apparatus, parisons in the form of tubes are extruded from an extruder into a neck mold of a head. The head includes label handling vacuum devices which remove labels from magazines and deposit the labels on cavities of mold sections One of the problems with such an arrangement is that a magazine is required for each of the label handling vacuum devices.

In another type of apparatus such as shown in U.S. Pat. No. 4,636,166, issued Jan. 13, 1987, intermediate endless belts are provided and indexed past magazines to pick up successively an array of labels and then label handling vacuum devices on the head remove the array of labels from the endless belts and deposit the labels in the cavities of the mold sections when the head moves down adjacent the extruder. Such an arrangement necessitates the use of intermediate belts with the associated costs and maintenance.

Accordingly, among the objectives of the present invention are to provide an in-mold labeling system which is more accurate, simpler, lower in cost and more reliable; which eliminates the use of endless belts and the associated label handling which applies the labels while the blow molding apparatus is performing other functions; and which requires only a single source of labels for each array of mold cavities.

In accordance with the invention, the apparatus for application of labels to the hollow blown plastic articles comprises a label carrier mounted for reciprocating movement between the open mold sections and supporting an array of spaced vacuum pick up devices The carrier is mounted for reciprocating movement past a source of labels exterior to the blow molding mechanism so that labels are picked up by each of the vacuum devices and when the carrier is moved between the longitudinally spaced array of mold sections, the vacuum devices are actuated to deliver the array of labels to the cavities of the array of open mold sections at the same time as the take out mechanism is moved adjacent the mold sections to grasp the blown containers so that the labels are delivered with substantially no delay in cycle time.

DESCRIPTION

Figure 1:
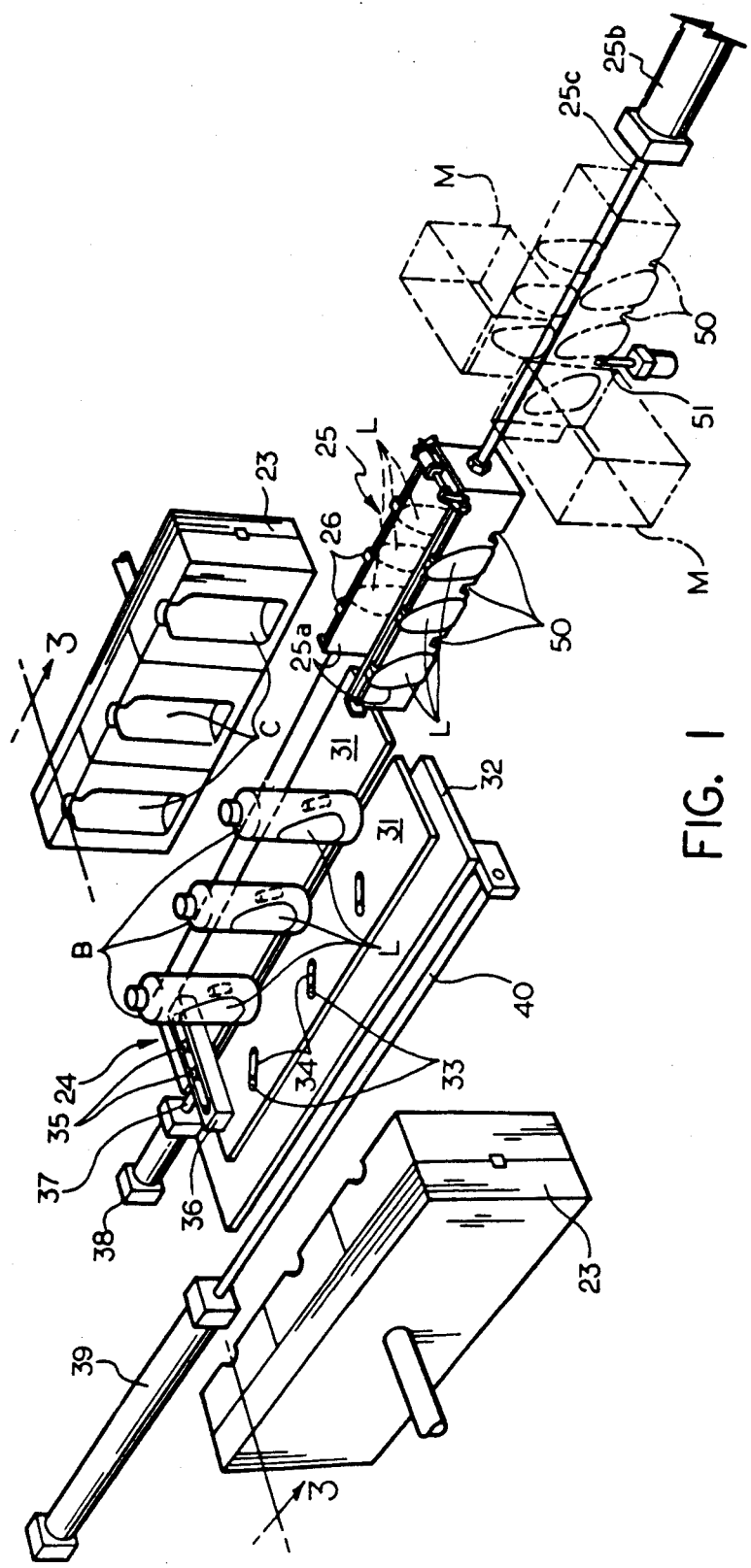
FIG. 1 is a partly schematic exploded perspective view of an apparatus embodying the invention.
Figure 2:
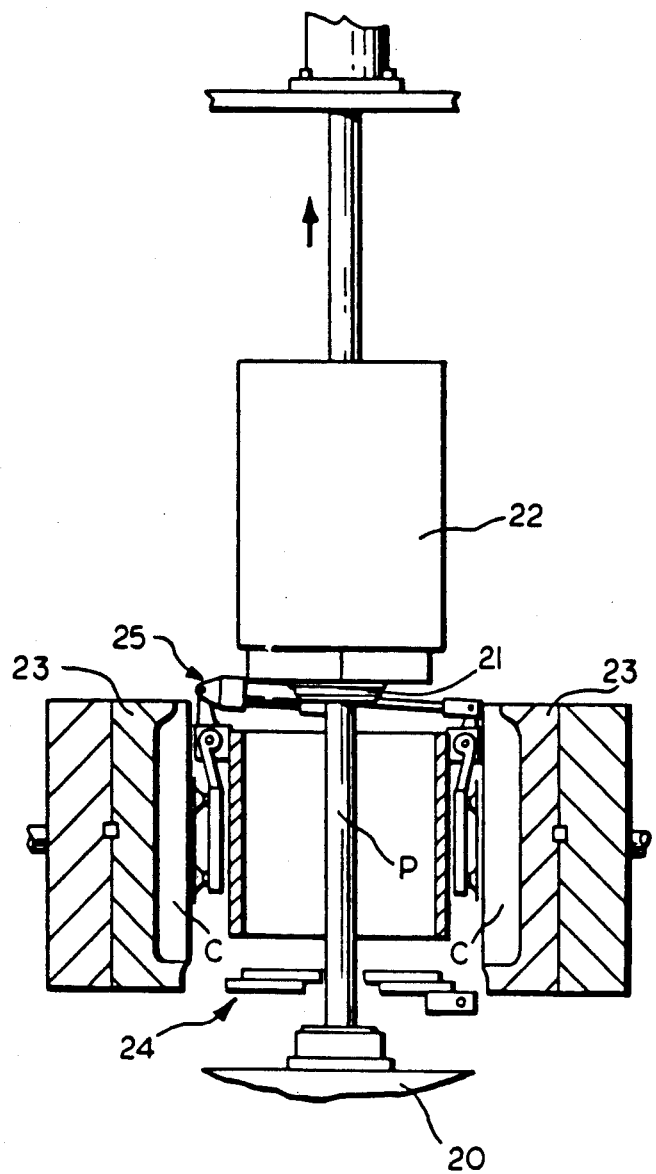
FIG. 2 is a vertical sectional view of a conventional blow molding apparatus to which the invention applies.

Referring to FIG. 2, in one type of blow molding apparatus a plurality of parisons in the form of tubes are extruded from an extruder 20 into a neck mold 21 of a head 22. As the extrusion continues, the head 22 is moved upwardly to define parisons P. Mold sections 23 defining an array of cavities C are then closed about the parisons and the parisons are blown outwardly. If labels are applied to the cavities of the mold sections, they become adhered or bonded to the hollow blown article that is formed. A take-out mechanism 24 then engages the bottles and removes them.

In accordance with the invention, a label carrier 25 is mounted for linear movement from a position externally of the blow molding apparatus to a position between the mold sections 23. Where labels L are to be applied to the cavities C of each mold section 23, the carrier 25 comprises spaced walls 25a which are spaced apart a distance such that the walls 25a may be moved into position adjacent the containers and between the containers and the mold sections 23. A cylinder 25b has its shaft 25c connected to carrier 25 for moving carrier 25 into and out of position adjacent magazines M between the mold sections. An array of longitudinally spaced vacuum devices 26 are mounted on the side of each wall 25a nearest the respective mold section 23. Vacuum devices 26 are at a spacing corresponding to the spacing of the longitudinally spaced array of cavities C of the mold sections 23. Each vacuum device 26 comprises a pivoted arm 27 supporting vacuum cups 28. A piston motor 29 has its shaft 30 pivoted to each arm 27 for moving the vacuum cups 28 transversely relative to the carrier 25. Initially the carrier 25 is moved successively past sources of labels L such as magazines M and the vacuum devices 26 are actuated to pick up a label L successively from the sources.

Take out mechanism 24 can be of any well-known construction for grasping the portion of containers B which has been formed by pinching the parison P as the mold sections 23 close. As shown, take-out mechanism 24 comprises plates 31 that are mounted on a base 32 for movement transversely toward and away from the containers B. Pins 33 on base 32 engage inclined slots 34 on plates 31. Pins 35 on plates 31 extend into a slot of a bracket 36 on the piston rod 37 of an actuator 38. Outward actuation of the actuator 38 moves the plates 31 transversely inwardly to grip and release the containers. A second actuator 39 has its shaft 40 connected to base 32 for moving the base 32 and plates of the take out mechanism longitudinally to remove the containers B.

Solenoid operated detents 51 are provided adjacent carrier 25 which project into openings 50 on carrier 25 to insure proper and successive indexing of the carrier adjacent magazines M.

Figure 3:
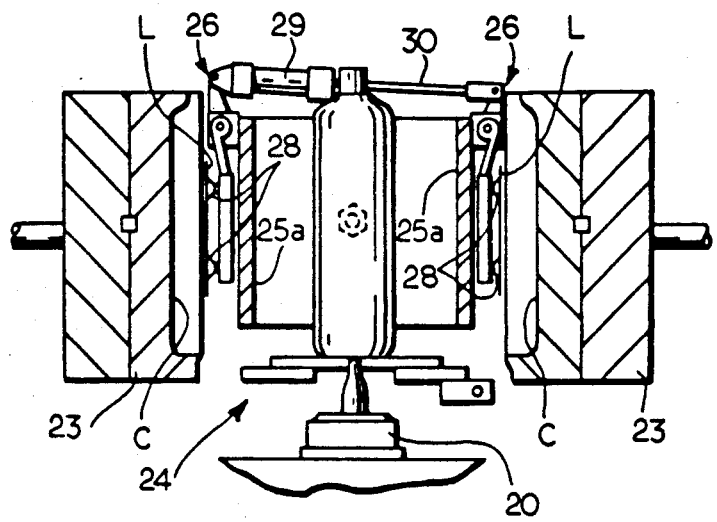
FIG. 3 is a vertical sectional view similar to FIG. 2 showing the apparatus in another position.
Figure 4:
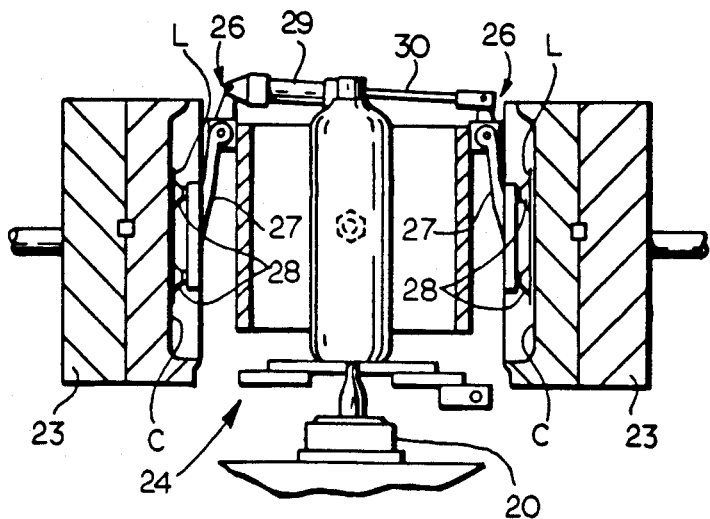
FIG. 4 is a view similar to FIG. 3 showing the apparatus in another position.

After hollow articles are blown and are being grasped by the take-out mechanism 24 to remove the articles, the carrier 25 is moved between the open mold sections 23 as shown in FIG. 3 bringing the array of labels L on the vacuum devices 26 into position adjacent the array of mold cavities C. The carrier 25 is moved between the mold sections 23 while the take-out mechanism 24 is moving inwardly to grip the containers so that there is no cycle delay. The vacuum devices 26 are then moved outwardly to deposit the array of labels L simultaneously to the mold cavities C as shown in FIG. 4.

It can be appreciated that if only one set of labels are to be applied to one array of mold cavities then labels will be removed only from one source or magazine. It can thus be seen that there has been provided an in-mold labeling system which is more accurate, simpler, lower in cost and more reliable; which eliminates the use of endless belts and the associated label handling which applies the labels while the blow molding apparatus is performing other functions; and which requires only a single source of labels for each array of mold cavities.

We claim:

1. In a method for forming hollow blown plastic articles by blow molding parisons into conformity with cavities of a longitudinally spaced array of mold sections wherein parisons are extruded in the form of tubes into an array of neck molds on a head, the head is moved axially away from the extruder to define the parisons, the array of mold sections are closed about the parisons, the parisons are blown outwardly to form hollow blown articles, and the blown articles are grasped by a take out mechanism and the mechanism is reciprocated generally horizontally in a first direction away from and a second direction toward said molds after the mold sections are opened, the improvement for applying labels to the hollow blown plastic articles comprising positioning a label carrier having an array of spaced vacuum pick up devices movably supported on said carrier mounted adjacent said molds for reciprocating movement generally horizontally in said first direction past a source of labels, at which the array of vacuum devices are actuated to pick up labels, to a position between the open mold sections and in said second direction generally horizontally away from said molds and toward the sources of labels, and moving the carrier in a reciprocating movement in said first direction to a position between the longitudinally spaced array of mold sections substantially at the same time as the take out mechanism is moved in said second direction adjacent the mold sections to grasp the blown articles and then moving the take out mechanism in said first direction to remove said blown articles as the labels are being applied to the array of cavities of the mold sections so that the labels are delivered with substantially no delay in cycle time such that the vacuum devices can be actuated to deliver the labels to the cavities of the array of open mold sections.

2. The method set forth in claim 1 including positioning a source of labels exterior of the mold sections, said step of moving said carrier being such as to move said carrier past said source of labels such that the labels are picked up by each of the vacuum devices.

3. The method set forth in claim 1 wherein said carrier comprises spaced walls, each wall supporting an array of vacuum pick up devices, said walls defining an open end such that the blown articles can be removed from between said walls through said open end by said take out mechanism as said labels are being applied to the array of cavities of the mold sections.

* * * * *